Jan. 9, 1968   D. L. HANSEN   3,362,492
SNOWBIKE ATTACHMENT
Filed Feb. 14, 1966   4 Sheets-Sheet 1
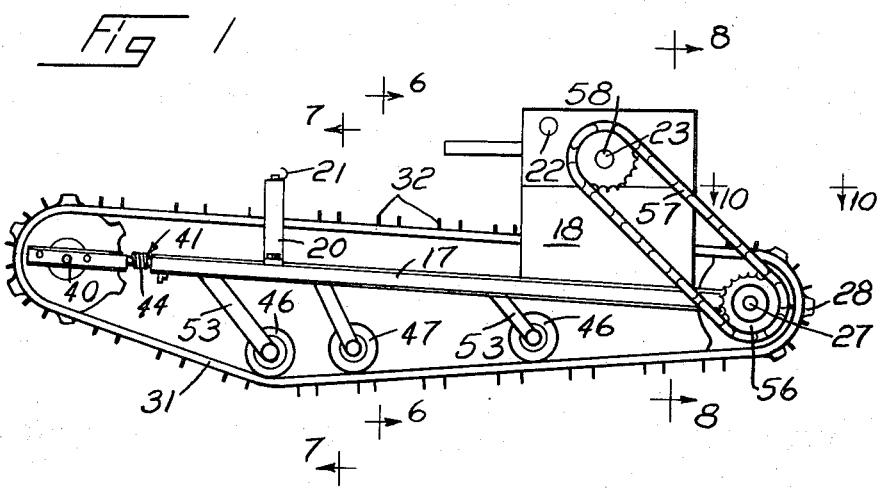
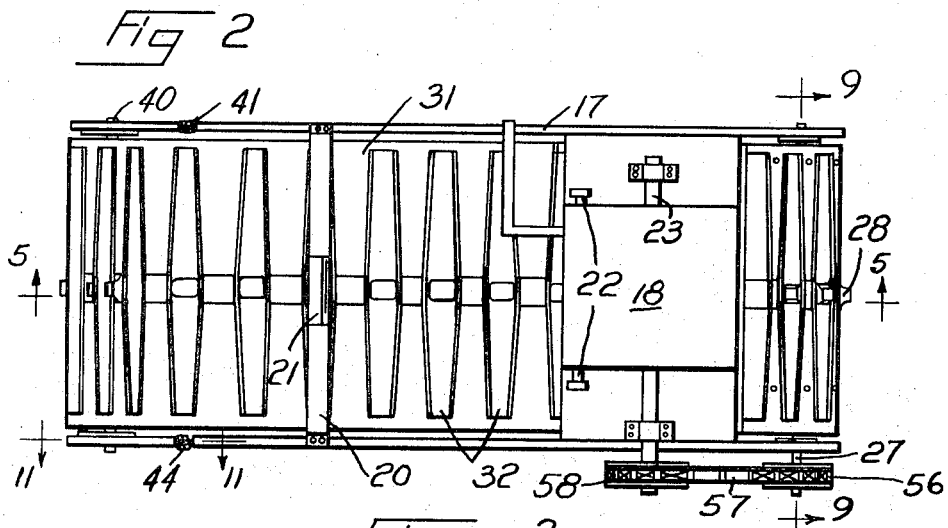
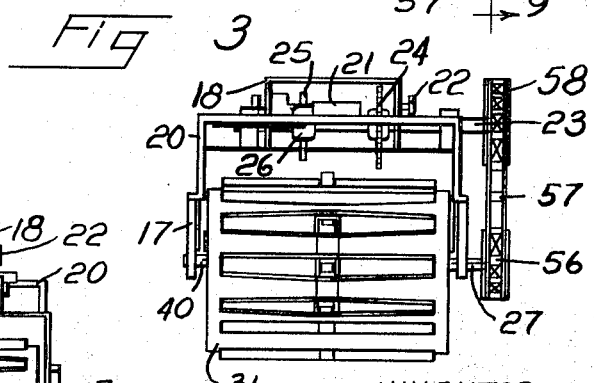
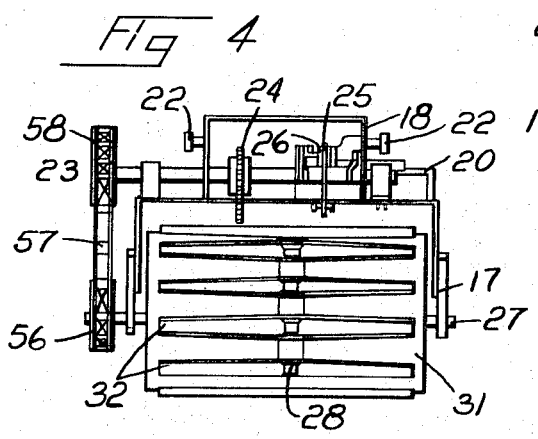
INVENTOR
DARRELL L. HANSEN
BY
ATTYS.

Jan. 9, 1968 D. L. HANSEN 3,362,492
SNOWBIKE ATTACHMENT
Filed Feb. 14, 1966 4 Sheets-Sheet 2
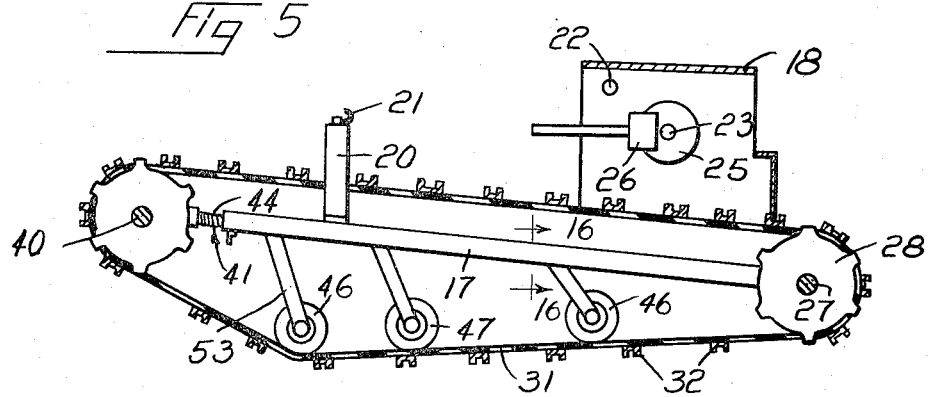
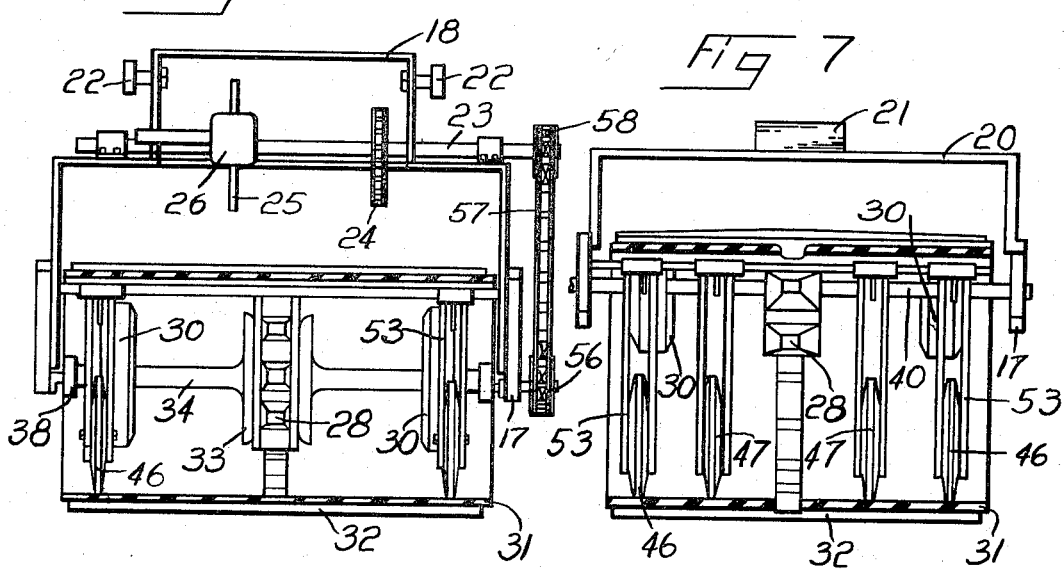
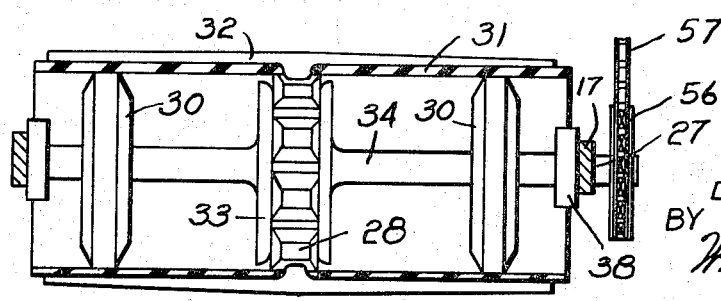
INVENTOR
DARRELL L. HANSEN
BY
ATTYS.

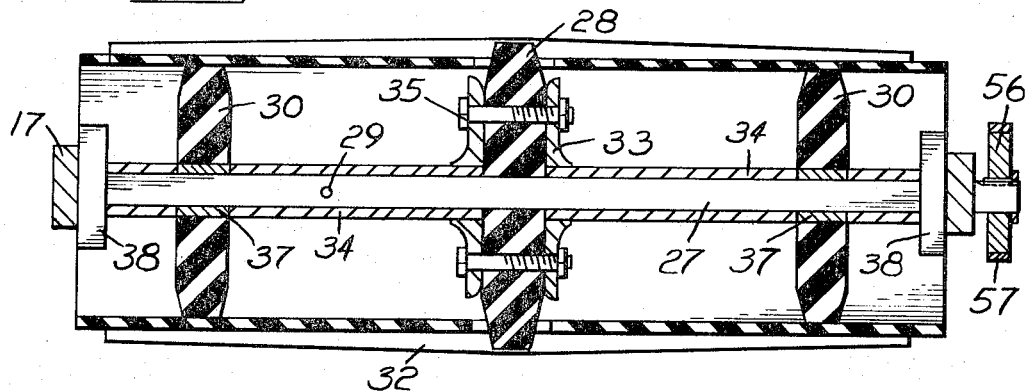
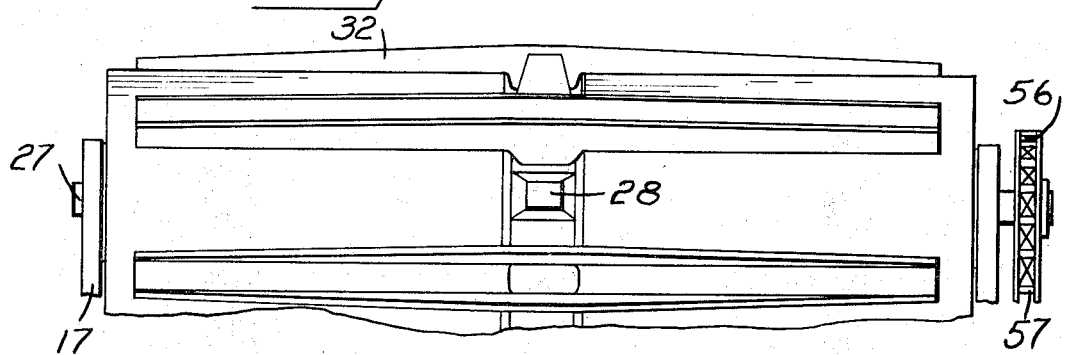
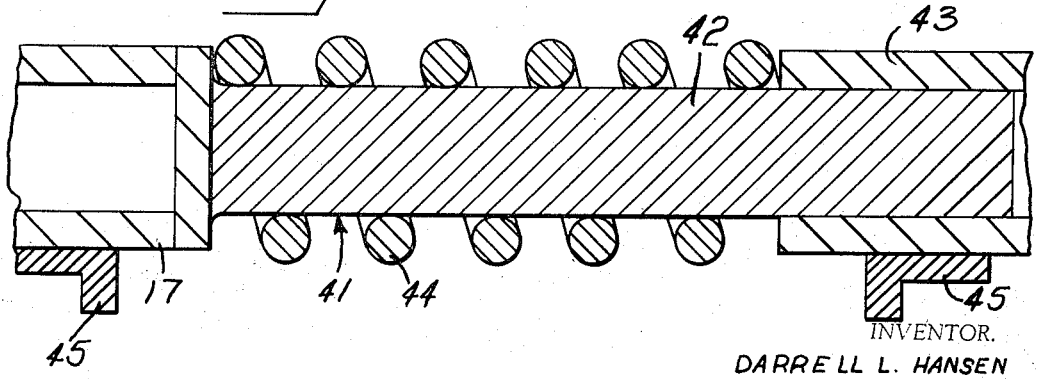

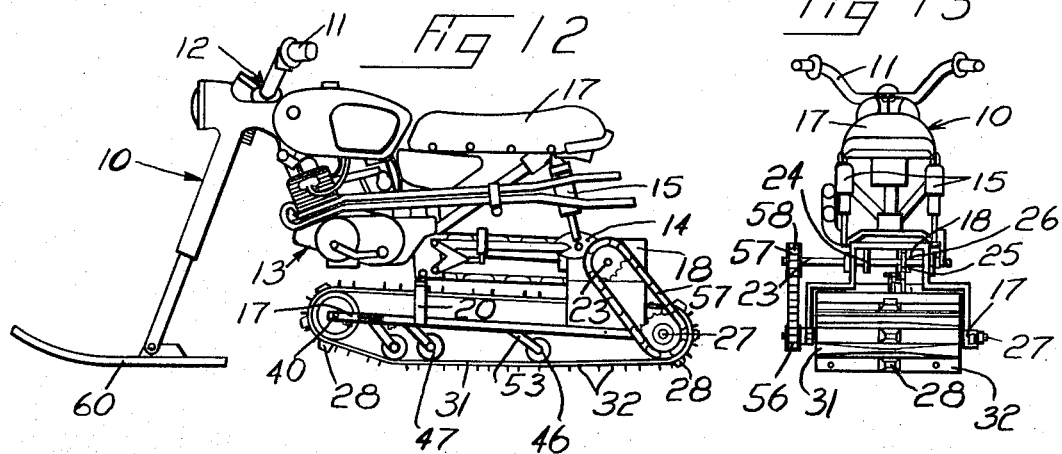
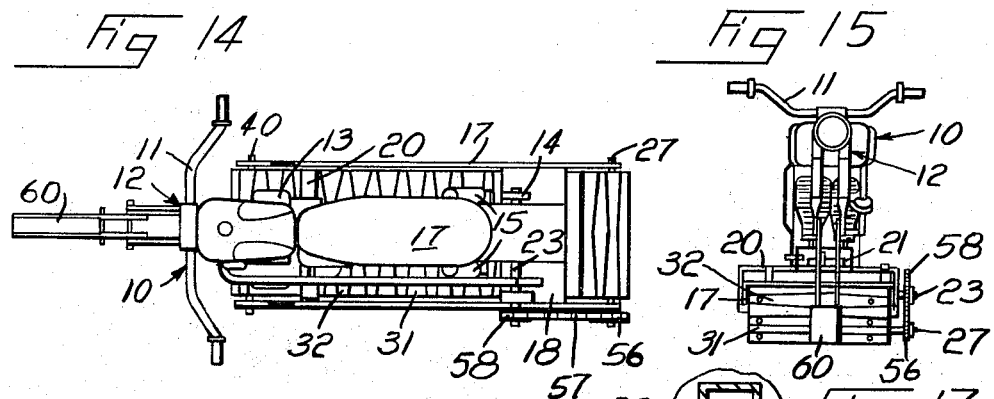
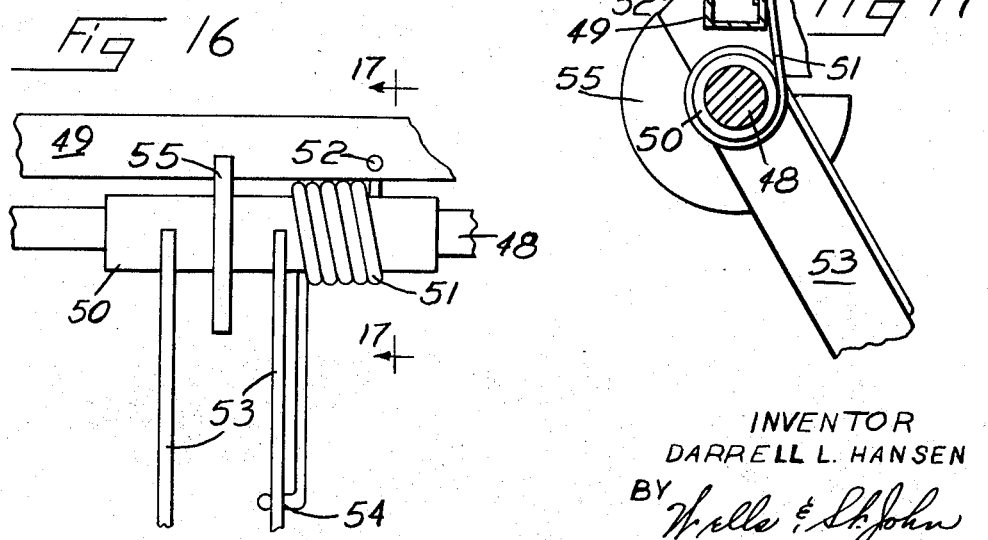

United States Patent Office 3,362,492
Patented Jan. 9, 1968

3,362,492
SNOWBIKE ATTACHMENT
Darrell L. Hansen, 2415 E. 1st,
Spokane, Wash. 99202
Filed Feb. 14, 1966, Ser. No. 527,192
8 Claims. (Cl. 180—5)

ABSTRACT OF THE DISCLOSURE

This invention relates to a snowbike attachment for converting existing models of motor-driven bikes or motorcycles to an endlesss track vehicle for use as a trail bike both on and off developed roads.

---

This invention relates to a snowbike attachment for existing models of motor-driven bikes or motorcycles, the device being particularly designed for use on trail bikes popularly used today for general travel both on and off developed roads.

The apparatus described below provides an attachment for a conventional motorcycle or motorbike that readily converts the bike for use on snow. It therefore contributes to the versatility of the vehicle making possible its use where otherwise the vehicle would be unusable or impractical. With the present attachment, a conventional bike can be used on ski slopes, for winter forestry and mountaineering purposes, and for recreational use both in city or country.

It is a first object of this invention to provide a simple attachment for a motorbike, converting the normally wheeled bike to an endless track vehicle having lugs that provide necessary traction and a wide-based support that permits the bike to be used in deep snow or on ice.

Another object of this invention is to provide such an apparatus that will permit the bike to be used on snow at speeds approximating its normal speed, the device being powered by the conventional vehicle drive mechanism.

Another object of this invention is to provide a novel track mechanism for use in snow, together with means to maintain the lower surface of the supporting track in its desired longitudinal configuration at all times during use of the bike on snow or ice.

These and further objects will be evident from the following disclosure, taken together with the accompanying drawings which illustrate a preferred form of the drawing. It is to be understood at the outset that this form of the invention is only presented by way of example and is not intended to limit the scope or application of the invention defined in my claims.

In the drawings:

FIGURE 1 is a side elevation view of a complete attachment assembly;

FIGURE 2 is a top view of the attachment shown in FIGURE 1;

FIGURE 3 is a front view of the attachment shown in FIGURE 1;

FIGURE 4 is a rear view of the attachment shown in FIGURE 1;

FIGURE 5 is a vertical sectional view taken along line 5—5 of FIGURE 2;

FIGURE 6 is an enlarged sectional view taken along line 6—6 in FIGURE 1;

FIGURE 7 is an enlarged sectional view taken along line 7—7 in FIGURE 1;

FIGURE 8 is an enlarged sectional view taken through the belt and supporting sprocket and wheels only as seen along line 8—8 in FIGURE 1;

FIGURE 9 is an enlarged sectional view taken along line 9—9 of FIGURE 2;

FIGURE 10 is a fragmentary top view of the rear end of the belt as seen along line 10—10 in FIGURE 1;

FIGURE 11 is a fragmentary sectional view at an enlarged scale taken through the frame members at the front of the framework as seen along line 11—11 in FIGURE 2;

FIGURE 12 is a side elevation view of a bike equipped with the instant attachment;

FIGURE 13 is a rear view of the bike shown in FIGURE 12;

FIGURE 14 is a top view of the bike shown in FIGURE 12;

FIGURE 15 is a front view of the bike shown in FIGURE 12;

FIGURE 16 is a fragmentary view taken adjacent to one of the bogey wheel supports on the framework substantially along line 16—16 in FIGURE 5; and FIGURE 17 is a fragmentary sectional view of the bogey wheel support as seen along line 17—17 in FIGURE 16.

To understand the nature of the instant attachment, attention is directed to FIGURES 12 through 15, which illustrate a conventional trail bike provided with the instant attachment and a front ski. A cycle so equipped is fully outfitted for use on snow of any depth or on ice, whether in the city or countryside. The bike 10 is typically provided with front handle bars 11 and a front steering assembly 12 connected thereto. Bike 10 has an engine and transmission unit 13 and a typical saddle 17 on which the one or two riders are supported. At the rear of bike 10 are rear shaft supporting brackets 14 carried by rear shock absorbers 15. The conversion of the bike to a snow cycle is accomplished by removing the conventional rear wheel assembly and front wheel assembly and substituting the track mechanism and ski as shown. It is also advisable to remove the kickstand typically provided adjacent to the engine and transmission unit 13, so that positive attachment of the front of the track supporting frame can be made at this or a similar location.

The details of the track driving attachment are shown in FIGURES 1 through 5. It basically comprises a rectangular supporting framework 17 having fixed to it an upstanding rear housing 18. The framework and housing 18 are preferably made of metal, but other suitable structural materials could be substituted. Framework 17 has a front arched support 20 that extends upwardly from it and which carries a clip 21 designed to fit about the conventional kickstand shaft on bike 10 to prevent vertical motion of framework 17 relative to the frame of bike 10.

The rear housing 18 has two outwardly protruding attachment lugs 22 which support framework 17. Lugs 22 are mounted on the rear shaft support brackets 14 of bike 10 in place of the conventional rear wheel axle. Immediately behind and slightly below the lugs 22 is a transverse driven shaft 23 parallel to the axis of lugs 22. Fixed to this shaft 23 within the housing 18 is a driven sprocket 24 powered by the conventional drive chain from the bike engine and transmission unit 13.

Also fixed to shaft 23 within housing 18 is a brake disc 25. A conventional disc brake mechanism 26 is mounted on housing 18 for selective engagement with disc 25, being provided with manual controls leading to the handle bar 11 in the usual fashion.

At the rear of framework 17 is a transverse rear shaft 27 rotatably journalled about an axis parallel to the axis of shaft 23. Shaft 27 is provided with an enlarged rubber sprocket 28 at the center of framework 17 and with two side support wheels 30 spaced transversely from the sprocket 28 at each side thereof (FIGURE 9).

At the front of framework 17 is a front shaft 40 similar to shaft 27. It also supports a sprocket 28 and support wheels 30 identical to those described with relation to rear shaft 27.

Encircling sprockets 28 and wheels 30 is an endless belt assembly comprising two flexible belts 31 that extend outwardly from the respective sides of the sprockets 28. The outer edges of belts 31 overlap wheels 30 and are supported thereby. The belts 31 are joined by transverse outer lugs 32 fixed to their outer belt surfaces longitudinally spaced positions equal to the spacing of the radial projections on sprockets 28. Lugs 32 are channelled members with flanges directed outwardly from belts 31 perpendicular to the outer surfaces of belts 31. They preferably taper in thickness and width toward their outer ends. The lugs 32 are utilized as the direct power transmitting elements for belts 31 between the two sprockets 28.

The sprockets 28 are supported on shaft 27 or shaft 40 in the manner seen in FIGURE 9. At each side of sprocket 28 is fixed a mounting disc 33 having axially extended collars 34 fixed thereto. One collar 34 is attached by a pin or weld to the shaft 27 or 40 as seen at 29. The mounting discs 33 are connected to one another by radially spaced bolts 35 extending through the sprockets 28.

The wheels 30 are each rotatably mounted on shaft 27 or 40 by central bushings 37 which abut the outer ends of collars 34. The outer end of each bushing 37 is axially located relative to framework 17 by spacers 37 which abut supporting shaft bearings 38 on framework 17. With this mounting arrangement, the sprockets 28 can be replaced or repaired by removing the right hand spacer 37, the adjacent wheel 30 and bushing 37, and by releasing the bolts 35 to permit the right hand collar 34 and disc 33 to be pulled from the shaft (FIGURE 9).

The front shaft 40 is carried by a longitudinally movable bearing support 41, the details of which are shown in FIGURE 11. The bearing support 41, which constitutes a portion of the rectangular framework 17, is longitudinally movable relative to the remainder of framework 17. A slidable shaft section 42 at each side of framework 17 is fixed to the bearing support 41. It is received within a complementary collar 43 formed at the front end of framework 17. Shaft 42 is encircled by a compression spring that abuts a forward shoulder on bearing support 41 and a rear shoulder on framework 17. Spring 44 is chosen to provide the desired tension in belts 31 by urging the bearing support 41 forwardly relative to the remainder of framework 17. For assembly or repair purposes, lugs 45 are formed on the framework 17 and bearing support 41 to permit the use of a clamp to contract spring 44 and relieve the tension on belts 31.

To permit this attachment to be used in loose deep snow, it is necessary that a substantial portion of the belts 31 leading to the rear of the attachment be flattened when the weight of bike 10 and a rider is applied to them. It is also important that the front portion of the lower flight of each belt 31 be inclined upwardly and forwardly from this flat section. The belt configuration is maintained by intermediate bogey wheels which can be seen in FIGURES 1, 5, 6 and 7. As shown, there are two sets of outer bogey wheels 46 and an intermediate set of inner bogey wheels 47. The outer wheels 46 are longitudinally aligned with the support wheels 30 previously described (FIGURE 6), while the inner wheels 47 are transversely positioned between the outer wheels 46 and the sprockets 28. This transverse spacing of the tapered rubber wheels 46, 47 acts to provide even pressure along the lower flight of each belt 31 and serves to assist in breaking ice and snow which might accumulate along these inner surfaces and which otherwise would build up on the surfaces of support wheels 30.

The bogey wheels 46, 47 must exert positive pressure on the lower flights of belts 31. This is provided by the mounting arrangement seen in FIGURES 16, 17. Each wheel 46 is carried by two wheel support arms 53 fixed to a collar 50. The collar 50 are transverse shafts 48 across the framework 17. A spring 51 is encircled about the collar 50, having one end connected at 52 to a transverse frame member and its remaining end connected at 54 to a support arm 53. Spring 51 therefore exerts an independent positive downwardly directed force on the support arms 53 and the bogey wheel carried thereby. The angular movement of each bogey wheel is limited by an angular stop 55 that has two radial surfaces which selectively abut the transverse frame member 49 so as to prevent the wheel from moving beyond its normal angular operational limits.

Power is supplied to belts 31 through the rear sprocket 28. The rear shaft 27 is powered by a driven sprocket 56 fixed to one outer end thereof. Sprocket 56 in turn is rotated by means of a driving sprocket 58 on shaft 23 and a connecting drive chain 57.

As seen in FIGURES 12 through 15, a typical bike 10 is also provided with a front ski 60, preferably spring biased to exert a downward force at the rear edge thereof. The details of the ski structure 60 are not important to an understanding of the power track attachment for driving the bike, and it is to be understood that any suitable ski apparatus or front wheel assembly can be used with the powered track attachment illustrated.

The operation of the bike 10 provided with the snow cycle attachment described above is precisely the same as when the bike 10 is driven on its normal wheels. The dual belts 31 provide flexibility and mobility to the bike not available from typical snowmobiles having two laterally spaced tracks. The ability of bike 10 to lean into a curve or along a bank or hill is unimpaired. It has the versatility and mobility inherent in two wheeled vehicles. Furthermore, this attachment can be mounted directly under the main portion of the bike without removing anything other than the rear wheel and fender assembly and the kickstand. The conventional shock absorbers and devices conventionally used for the comfort and safety of riders are maintained in their original conditions of operation.

The details of the structure shown above are only illustrative of the device, which provides a practical driving track unit for a two-wheeled vehicle frame. The independent mounting of belts in close side by side positions, together with the independently movable bogey wheels for maintaining proper belt configuration and tension permit the bike to be used in a manner comparable to its general use on a dry surface. Obviously, modifications can be made in the frame configuration and in the details of the elements described without deviating from the basic objectives and concepts of the device.

Having thus described my invention, I claim:

1. A track attachment for a motor-driven bike to replace the rear drive wheel that is normally mounted to the rear axle brackets of the bike frame and to extend forward for connection with the bike frame kickstand support housing located in the lower midportion of the bike frame to enable the bike to be used on snow and ice, said attachment comprising:
   (a) an attachment frame mounted to said bike frame brackets and extending forward therefrom with a bracket connected to the kickstand support housing to prevent vertical motion of the forward end of the attachment frame relative to the bike frame;
   (b) front and rear transverse shafts rotatably mounted to the attachment frame;
   (c) front and rear track sprockets mounted on the front and rear transverse shafts respectively;
   (d) track support wheels rotatably mounted on the front and rear transverse shafts respectively straddling the track sprockets;
   (e) a single endless flexible track mounted about the sprockets and the support wheels for supporting and moving the bike over the snow; and (f) drive means operatively connecting the bike motor and the rear transverse shaft for driving the track.

2. The attachment as defined in claim 1 wherein the track sprockets are mounted on the transverse shafts in vertical with the bike frame.

3. The attachment as defined in claim 2 wherein said endless track comprises:
   (a) a pair of endless flexible belts mounted in side-by-side relationship on the track support wheels straddling the track sprockets; and
   (b) a plurality of equally spaced transverse lugs affixed to and extending between the belts, said lugs being spaced to permit central engagement thereof by the teeth of the track sprockets.

4. The attachment as defined in claim 3 wherein the front transverse shaft is elevated above the driven rear transverse shaft and wherein the attachment further comprises:
   sets of spring biased pressure wheels mounted to the attachment frame for engaging the inner surface of the belts along the lower flight thereof to define a lower flight that has an inclined forward and upward extending front section for compacting the snow as the bike is propelled and a rear extending section for supporting the rear of the bike.

5. The attachment frame as defined in claim 1 wherein the sprockets and track support wheels are made of rubber.

6. The attachment as defined in claim 1 wherein the sprockets are affixed to axially extending collars mounted on the transverse shafts and wherein the rear collars are rigidly connected to the rear transverse shaft and wherein further the track support wheels are rotatably mounted on the transverse shafts by bushings that abut the ends of the collars to evenly space the support wheels on both sides of the sprockets.

7. The attachment as defined in claim 1 wherein the attachment frame comprises:
   (a) a pair of transversely spaced forward extending support shafts;
   (b) a pair of complementary collars slidably mounted on the forward extending shafts for supporting the front transverse shaft therebetween; and
   (c) compression springs mounted about the support shafts for biasing the complementary collars forward to provide an even track tension.

8. The attachment as defined in claim 7 wherein the attachment has three sets of longitudinally spaced pressure wheels that engage the lower belt flights and wherein each of the wheel sets is independently pivotally mounted to the attachment frame in a rearward and downward orientation and wherein spring means are mounted between the attachment frame and the wheel brackets for biasing the pressure wheels downwardly and forward against the lower flight of the belts.

References Cited

UNITED STATES PATENTS

| | | | |
|---|---|---|---|
| 1,800,979 | 4/1931 | Bayard | 305—35 |
| 2,617,659 | 11/1952 | Grenier | 180—5 X |
| 3,077,238 | 2/1963 | Nelson | 180—5 X |
| 3,023,824 | 3/1962 | Bombardier | 180—5 X |
| 3,250,577 | 5/1966 | Olson | 305—38 X |
| 3,252,533 | 5/1966 | Aeder | 180—9.24 X |
| 3,285,676 | 11/1966 | Hetteen | 305—27 |

FOREIGN PATENTS 1,063,512  12/1953  France.

RICHARD J. JOHNSON, *Primary Examiner.*